United States Patent
Kim et al.

(10) Patent No.: US 12,541,137 B2
(45) Date of Patent: Feb. 3, 2026

(54) APERTURE MODULE AND CAMERA MODULE INCLUDING THE SAME

(71) Applicant: SAMSUNG ELECTRO-MECHANICS CO., LTD., Suwon-si (KR)

(72) Inventors: Sungyeon Kim, Suwon-si (KR); Kyungmoon Jung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 167 days.

(21) Appl. No.: 18/604,717

(22) Filed: Mar. 14, 2024

(65) Prior Publication Data
US 2025/0068036 A1  Feb. 27, 2025

(30) Foreign Application Priority Data
Aug. 21, 2023 (KR) .................. 10-2023-0109303

(51) Int. Cl.
*G03B 9/14* (2021.01)
*G02B 27/64* (2006.01)
(Continued)

(52) U.S. Cl.
CPC .............. *G03B 9/14* (2013.01); *G02B 27/646* (2013.01); *G03B 5/00* (2013.01); *G03B 9/06* (2013.01);
(Continued)

(58) Field of Classification Search
CPC .................................. G03B 9/06; G03B 9/14
See application file for complete search history.

(56) References Cited

U.S. PATENT DOCUMENTS

| | | | |
|---|---|---|---|
| 6,340,252 B1 | 1/2002 | Kawano | |
| 7,773,313 B2 * | 8/2010 | Ishizuka | ............... G03B 17/12 359/700 |

(Continued)

FOREIGN PATENT DOCUMENTS

| | | |
|---|---|---|
| JP | 2000-352737 A | 12/2000 |
| JP | 2002-162666 A | 6/2002 |

(Continued)

OTHER PUBLICATIONS

Korean Office Action issued on Oct. 2, 2025, in counterpart Korean Patent Application No. 10-2023-0109303(9 pages in English, 8 pages in Korean).

*Primary Examiner* — Leon W Rhodes, Jr.
(74) *Attorney, Agent, or Firm* — NSIP Law

(57) ABSTRACT

An aperture module includes a base including a guide slot and a protruding pivot pin; a blade unit including a plurality of blades which pivot to form a first diameter aperture and a second diameter aperture; and an aperture driver including a driving pin that moves along the guide slot. The driving hole includes a first end portion and a second end portion that contact the driving pin when the first and second diameter apertures are formed, and a central portion that connects the first end portion and the second end portion. A width of a central portion of the driving hole in a first direction that is vertical to a center line connecting two points between the first end portion and the second end portion by a maximum distance is greater than maximum widths of the first end portion and the second end portion.

21 Claims, 11 Drawing Sheets

(51) Int. Cl.
  *G03B 5/00* (2021.01)
  *G03B 9/06* (2021.01)
  *G03B 13/36* (2021.01)

(52) U.S. Cl.
  CPC ...... *G03B 13/36* (2013.01); *G03B 2205/0069* (2013.01)

(56) References Cited

U.S. PATENT DOCUMENTS

| | | | |
|---|---|---|---|
| 10,809,595 B2 * | 10/2020 | Shikama | G03B 9/14 |
| 2004/0258405 A1 | 12/2004 | Shiratori et al. | |
| 2013/0170009 A1 | 7/2013 | Yoshizawa et al. | |
| 2014/0119719 A1 | 5/2014 | Kozu et al. | |
| 2019/0391462 A1 * | 12/2019 | Ushio | G03B 9/10 |
| 2024/0085760 A1 * | 3/2024 | Kim | G03B 9/02 |

FOREIGN PATENT DOCUMENTS

| | | | | |
|---|---|---|---|---|
| JP | 2004-177693 A | 6/2004 | | |
| KR | 10-2020-0020371 A | 2/2020 | | |
| WO | WO-2012108302 A1 * | 8/2012 | ............... | G03B 9/06 |
| WO | WO 2013/005439 A1 | 1/2013 | | |

\* cited by examiner

APERTURE MODULE AND CAMERA MODULE INCLUDING THE SAME

CROSS-REFERENCE TO RELATED APPLICATIONS

This application claims the benefit under 35 USC § 119(a) of Korean Patent Application No. 10-2023-0109303 filed on Aug. 21, 2023, in the Korean Intellectual Property Office, the entire disclosure of which is incorporated herein by reference for all purposes.

BACKGROUND

1. Field

The following description relates to an aperture module and a camera module including the same.

2. Description of the Background

Cameras may be implemented in portable electronic devices such as, but not limited to, smartphones, tablet personal computers (PCs), or laptop computers. As the competition for product differentiation of the portable electronic devices has deepened, examples of applying operations of general digital cameras to cameras of the portable electronic devices has increased. From among them, the desire to obtain the bokeh effect, or to obtain bright and sharp photographs by adjusting an amount of light by varying the aperture has increased.

The variable aperture may control an amount of light by changing sizes of incident holes using a plurality of blades. The blade may be combined with a driving pin formed in an aperture module and may be driven, and when the blade falls and impacts occur, the blade may be deformed by the driving pin. Accordingly, the development of an aperture with less deformation for impacts is desired.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an aperture module includes a base including a guide slot and a protruding pivot pin disposed in a corner region of the base; a blade unit including a plurality of blades each having a driving hole that overlaps at least a portion of the guide slot, and configured to pivot with respect to the pivot pin to form an aperture of a first diameter and an aperture of a second diameter; and an aperture driver including a driving pin configured to penetrate the guide slot and the driving hole, and is configured to move along the guide slot, wherein the driving hole includes a first end portion that contacts the driving pin when the aperture of the first diameter is formed, a second end portion that faces the first end portion and contacts the driving pin when the aperture of the second diameter is formed, and a central portion that connects the first end portion and the second end portion, and wherein a width of a central portion of the driving hole in a first direction that is vertical to a center line that connects two points between the first end portion and the second end portion by a maximum distance is greater than a maximum width of the first end portion and a maximum width of the second end portion.

The driving hole may include a portion of which a width of the driving hole in the first direction increases when approaching the central portion from at least one of the first end portion and the second end portion.

The driving hole may include a portion of which a width of the driving hole in the first direction increases and then reduces in a second direction that is parallel to the center line.

A diameter of the driving pin may be less than a width of the central portion in the first direction.

A line that contacts an edge of the central portion may be inclined to have an angle with respect to the center line.

A curvature of an edge of the first end portion and a curvature of an edge of the second end portion may be greater than a curvature of the central portion.

The aperture driver may include a moving member configured to move back and forth in a straight line to move the driving pin, and an aperture driving magnet, installed in the moving member, and disposed to face an aperture driving coil.

The driving pin may protrude upward from an upper end of the moving member.

The driving hole may be linearly symmetric with respect to the center line.

The plurality of blades may be one pair of blades.

A curvature of an edge of the first end portion and a curvature of an edge of the second end portion may be equal to a curvature of the driving pin.

The central portion may include a portion of which a width increases to respective sides of the driving hole with respect to the center line.

In a general aspect, an aperture module includes a housing having an internal space; a lens driving module disposed in the internal space of the housing and configured to be driven in at least one of an optical axis direction and a direction that is perpendicular to the optical axis direction; and an aperture module disposed at a front end of the lens driving module, and configured to adjust a size of an incident hole, wherein the aperture module includes a base comprising a guide slot and a protruding pivot pin disposed in a corner region of the base, a blade unit comprising a plurality of blades each having a driving hole that overlaps at least a portion of the guide slot, and configured to pivot with respect to the pivot pin to form an aperture of a first diameter and an aperture of a second diameter, and an aperture driver comprising a driving pin disposed in the guide slot and the driving hole, and configured to move along the guide slot, wherein the driving hole includes a first end portion that contacts the driving pin when the aperture of the first diameter is formed, a second end portion that faces the first end portion and contacts the driving pin when the aperture of the second diameter is formed, and a central portion that connects the first end portion and the second end portion, and wherein a width of a central portion of the driving hole in a first direction that is perpendicular to a center line that connects two points between the first end portion and the second end portion by a maximum distance is greater than a maximum width of the first end portion and a maximum width of the second end portion.

The driving hole may include a portion of which a width of the driving hole in the first direction increases when approaching the central portion from at least one of the first end portion and the second end portion.

The driving hole may include a portion of which a width of the driving hole in the first direction increases and then reduces in a second direction that is parallel to the center line.

A diameter of the driving pin may be less than a width of the central portion in the first direction.

A line that contacts an edge of the central portion may be inclined to have an angle with respect to the center line.

The aperture driver may include a moving member configured to move back and forth in a straight line to move the driving pin, and an aperture driving magnet, installed in the moving member, and disposed to face an aperture driving coil.

The driving hole may be linearly symmetric with respect to the center line.

The lens driving module may include an auto focus (AF) carrier configured to receive a lens barrel, an AF driver disposed outside the AF carrier and configured to move the lens barrel and the AF carrier in the optical axis direction, an optical image stabilization (OIS) carrier disposed in the AF carrier, and an OIS driver disposed outside the OIS carrier and configured to move the OIS carrier in a direction that is perpendicular to the optical axis direction.

The aperture driver, the AF driver, and the OIS driver may be respectively disposed on different sides of the housing.

Other features and aspects will be apparent from the following detailed description, the drawings, and the claims.

Figure 1:
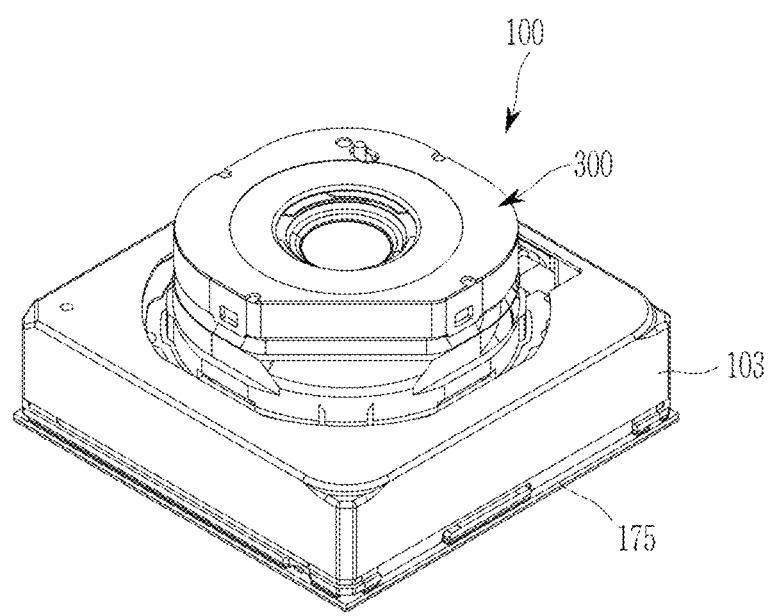
FIG. 1 illustrates a perspective view of an exterior of an example camera module, in accordance with one or more embodiments.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

The phrase "in a plan view" or "on a plane" means viewing a target portion from the top, and the phrase "in a cross-sectional view" or "on a cross-section" means viewing a cross-section formed by perpendicularly cutting a target portion from the side.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

One or more examples may provide an aperture module that reduces deformation of a blade caused by impacts when falling, and a camera module including the same.

One or more examples may reduce the deformation of the blade caused by impacts in the case of falling to thus increase the falling reliability and reduce the risk of bad driving.

Figure 2:
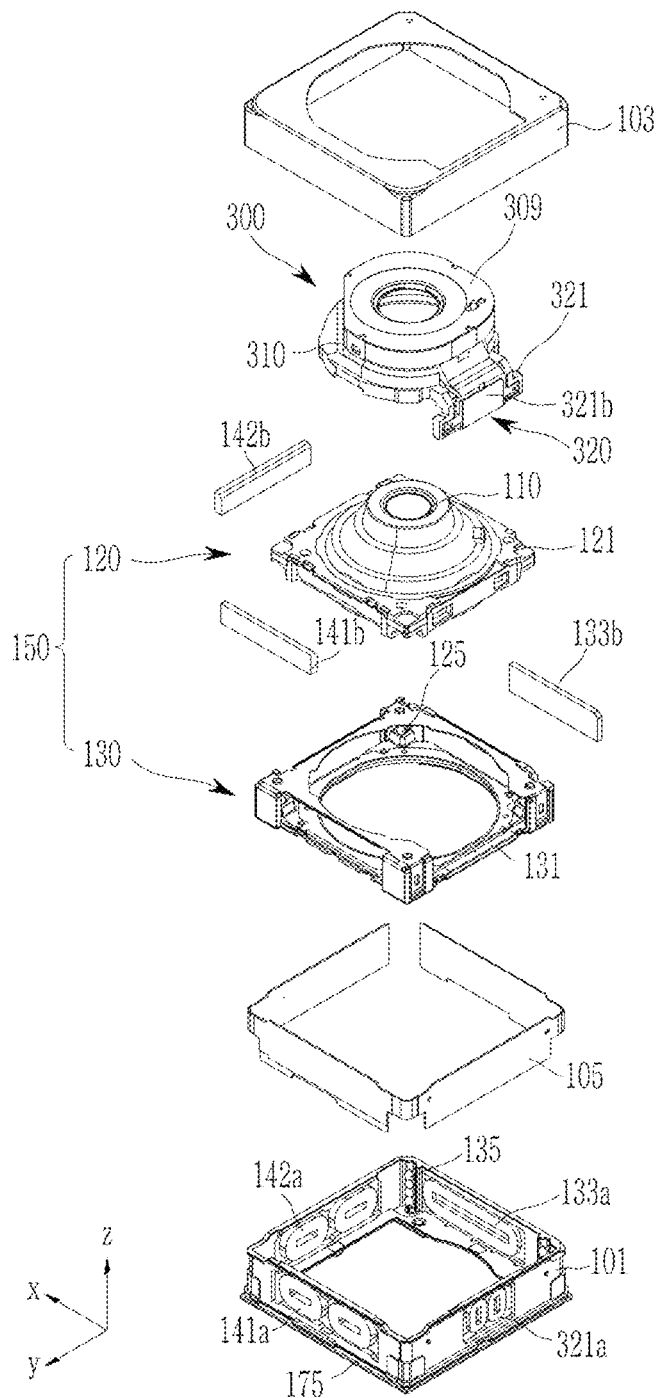
FIG. 2 illustrates an exploded perspective view of the example camera module shown in FIG. 1.
Figure 3:
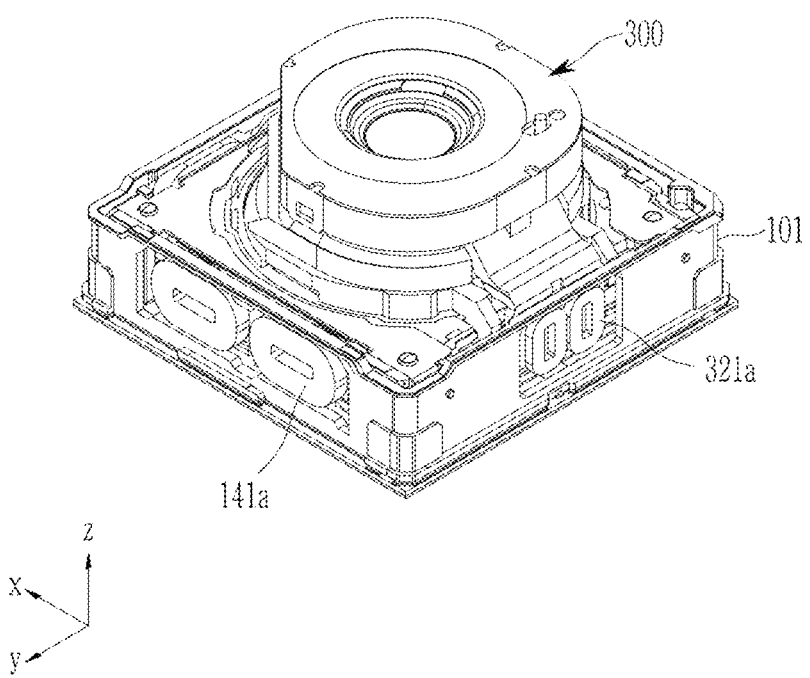
FIG. 3 illustrates a perspective view of a portion of an example camera module, in accordance with one or more embodiments.

FIG. 1 illustrates a perspective view of an exterior of an example camera module, in accordance with one or more embodiments, FIG. 2 illustrates an exploded perspective view of an example camera module shown in FIG. 1, and FIG. 3 illustrates a perspective view of a portion of a camera module according to an embodiment.

Referring to FIG. 1 to FIG. 3, the example camera module 100 may include a lens barrel 110, a lens driving module 150 that moves the lens barrel 110, an aperture module 300 that adjusts a size of an incident hole, and an image sensor unit that converts incident light into electric signals. The lens barrel 110 and the lens driving module 150 are received or disposed in a housing 101 together with the aperture module 300. The housing 101 is covered by the cover 103.

The lens barrel 110 may have a hollow space in a cylindrical shape to receive lenses for photographing a subject into the lens barrel 120, and the lenses may be mounted in the lens barrel 110 along an optical axis. A desired number of lenses may be disposed according to an implementation of the lens barrel 110, and the respective lenses may have optical characteristics such as identical or different refractive indexes.

The lens driving module 150 may mount the lens barrel 110 and may move the lens barrel 110, and may include an auto focus (AF) unit 130 that adjusts a focus and an optical image stabilization (OIS) unit 120 that corrects for hand trembling or shakes. In an example, the lens driving module 150 may adjust the focus by moving the lens barrel 110 in an optical axis direction (z-axis direction in the figure) by using the AF unit 130, or may realize a zoom operation, and may correct the hand trembling or shakes at the time of photographing by moving the lens barrel 110 in a direction (x-axis or y-axis direction in the figure) that is perpendicular to the optical axis direction by using the OIS unit 120.

The AF unit 130 includes an AF carrier 131 that receives the lens barrel 110, and an AF driver that generates a driving force to move the lens barrel 110 and the AF carrier 131 in the optical axis direction. The AF driver may be disposed outside the AF carrier 131. The AF driver may include an AF driving magnet 133b and an AF driving coil 133a. The AF driving magnet 133b may be installed on one side of the AF carrier 131, and the AF driving coil 133a may be installed in the housing 101 with a circuit board 105 as a medium. One or more rolling members 135 in a ball shape may be disposed between the AF carrier 131 and the housing 101 to reduce friction therebetween when the AF carrier 131 moves.

The OIS unit 120 may include an OIS carrier 121 that guides a movement of the lens barrel 110 and an OIS driver that generates a driving force to move the OIS carrier 121 in a direction that is perpendicular to the optical axis direction. The OIS carrier 121 may be received or disposed in the AF carrier 131, may be arranged in the optical axis direction, and may guide the movement of the lens barrel 110. The OIS carrier 121 may include a center opening in which the lens barrel 110 is inserted, and the lens barrel 110 may be combined and fixed to the OIS carrier 121 through the center opening.

The OIS driver may be disposed outside the OIS carrier 121. The OIS driver may include a first OIS driver including a first OIS driving coil 141a and a first OIS driving magnet 141b, and a second OIS driver including a second OIS driving coil 142a and a second OIS driving magnet 142b. The first and second OIS driving magnets 141b and 142b may be installed in the OIS carrier 121, and the first and second OIS driving coils 141a and 142a respectively facing the first and second OIS driving magnets 141b and 142b may be installed to be fixed to the housing 101 with the circuit board 105 as a medium.

The first OIS driver may generate a driving force in the x-axis direction that is perpendicular to the optical axis direction, and the second OIS driver may generate a driving force in the y-axis direction that is perpendicular to the optical axis and the x-axis direction. Rolling members 125 in a ball shape may be provided between the AF carrier 131 and the OIS carrier 121 to allow constituent elements of the OIS unit 120 to move fluently.

The image sensor unit converts light input through the lens barrel 110 into electric signals. In an example, the image sensor unit may include an image sensor (not shown) and a printed circuit board 175 connected thereto, and may further include an infrared filter (not shown). The infrared filter may block light in the infrared ray region from among the light input through the lens barrel 110.

Referring to FIG. 2, the aperture module 300 applied to the camera module 100 may be disposed on an upper end of the lens driving module 150, and may be disposed at an upper end of the lens driving module 150 with respect to a light incident direction. The aperture module 300 may be combined to the lens driving module 150, and may move in the optical axis direction and the direction that is vertical to the optical axis direction. The aperture module 300 may selectively change an incident amount of light input to the lens driving module 150.

The aperture module 300 may include an aperture driver 320 that extends to a bottom side of the housing 101 from an edge on one side, and is received in an internal space of the housing 101. The aperture driver 320 may include an aperture driving coil 321a installed in the housing 101 with the circuit board 105 as a medium, an aperture driving magnet 321b that faces the aperture driving coil 321a, and a moving member 321. The aperture driving magnet 321b may be installed in the moving member 321 and may move back and forth in a straight line.

The aperture driver 320, the AF driver, and the OIS driver may be disposed on different sides of the housing 101. In an example, the housing 101 may include first to fourth sides that are parallel to the optical axis (the z-axis). The aperture driver 320 may be disposed on a first side of the housing 101, and the AF driver may be disposed on a second side that is near the first side of the housing 101. The OIS driver may be disposed on a third side facing the first side of the housing 101 and a fourth side facing the second side.

Figure 4:
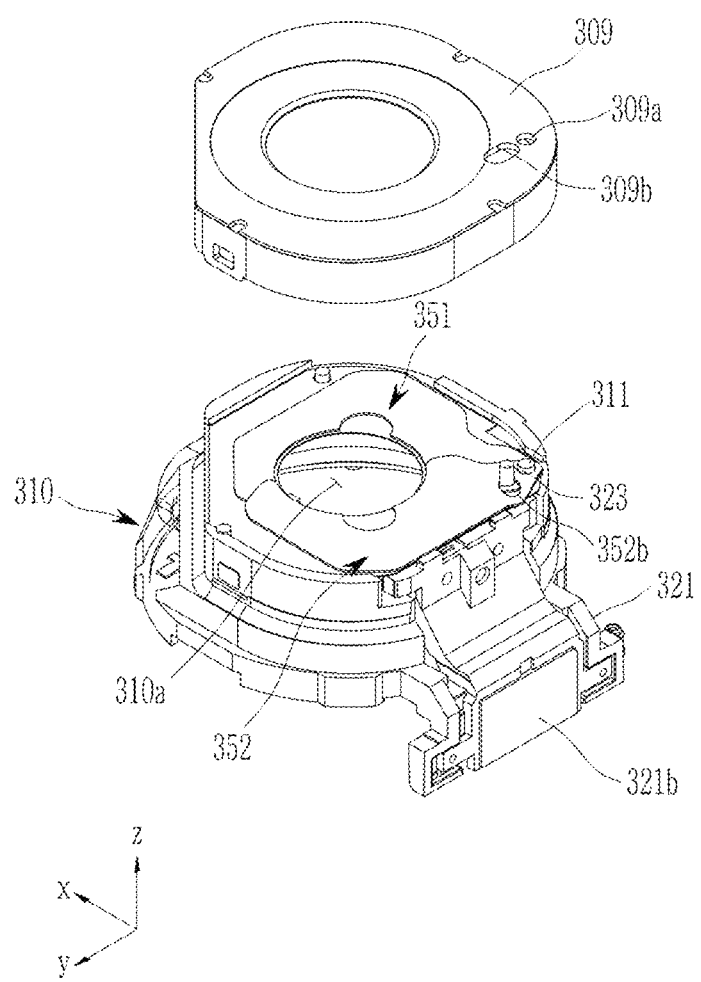
FIG. 4 illustrates a combined perspective view of a de-assembled aperture cover of an aperture module illustrates in FIG. 2.

When a voltage is applied to the aperture driving coil 321a, the moving member 321, which includes the aperture driving magnet 321b, may move back and forth in a straight line in the direction that is vertical to the optical axis direction based on an electromagnetic influence between the aperture driving magnet 321b and the aperture driving coil 321a. The moving member 321 may be coupled to a plurality of blades 351 and 352 as illustrated in FIG. 4 on the base 310 to provide a driving force. The back and forth movement in the straight line by the moving member 321 may be switched to a pivot motion of the blades 351 and 352 and the incident hole size of the aperture module 300 may be adjusted.

Figure 5:
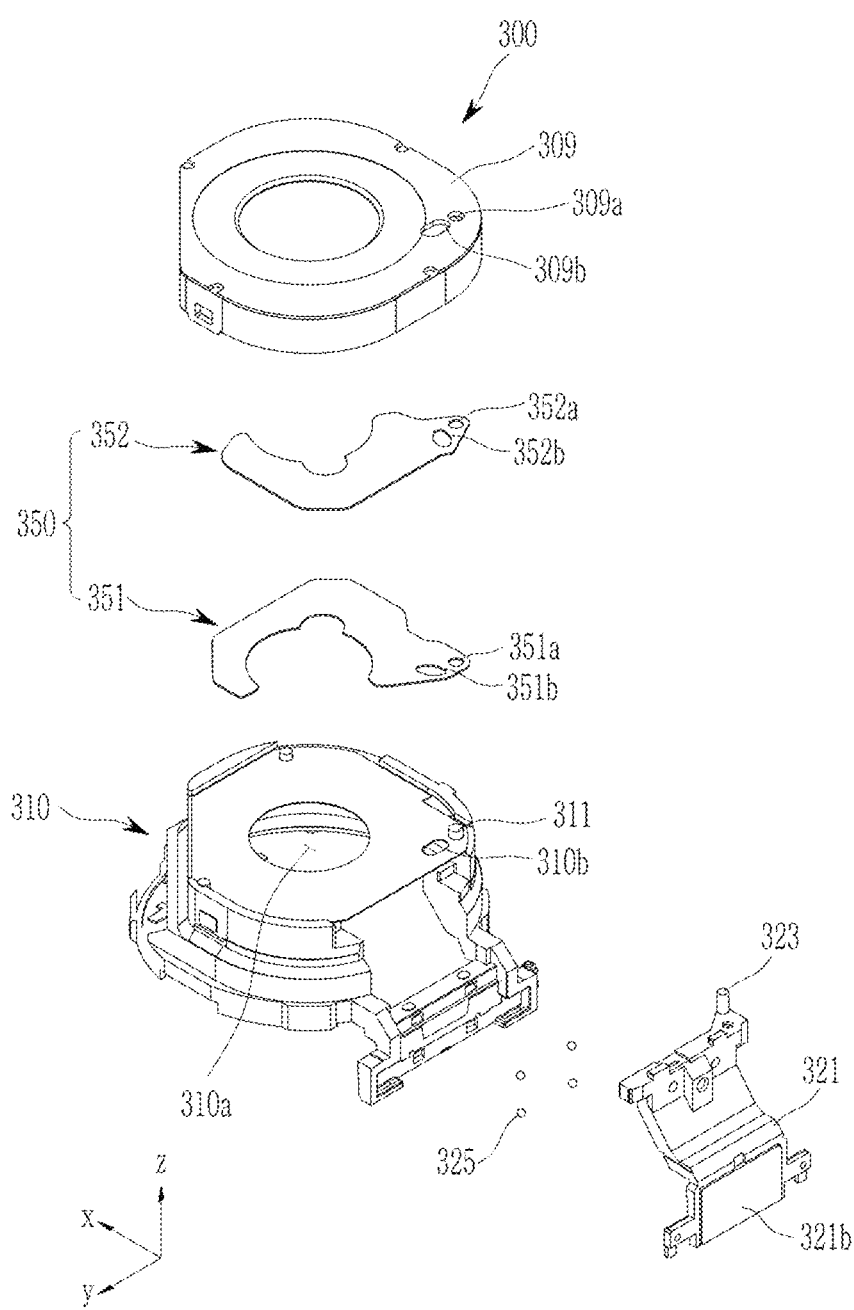
FIG. 5 illustrates an exploded perspective view of a de-assembled aperture module illustrated in FIG. 4.

FIG. 4 illustrates a combined perspective view of a de-assembled aperture cover of an example aperture module illustrated in FIG. 2, and FIG. 5 illustrates an exploded perspective view of an example de-assembled aperture module illustrated in FIG. 4.

Referring to FIG. 4 and FIG. 5, the blade unit 350 may be disposed on the base 310 in the aperture module 300. The blade unit 350 may include the plurality of blades 351 and 352. One blade unit 350 is illustrated. However, this is a non-limited example, and a plurality of blades units may be sequentially stacked in the optical axis direction to configure the aperture module. In a non-limited example, the plurality of blades 351 and 352 may be one pair of blades 351 and 352.

The base 310 may include a pivot pin 311, and may include a center opening 310a. The pivot pin 311 may protrude in the optical axis direction in a corner region of the base 310, and, in an example, the plurality of blades 351 and 352 may be combined to the pivot pin 311. Accordingly, the plurality of blades 351 and 352 may have pivot pin holes 351a and 352a, respectively.

The aperture module 300 may include an aperture driver 320 disposed on one edge of the base 310. The aperture driver 320 may include a moving member 321 that moves back and forth in a straight line in parallel to the one edge of the base 310, and the aperture driving magnet 321b may be installed in or on the moving member 321. Rolling members 325, in a ball shape, may be provided between the base 310 and the moving member 321 to allow the moving member 321 to move fluently. Referring to FIG. 3 together with FIG. 4, the aperture driving coil 321a may be spaced from the aperture driving magnet 321b by a predetermined interval to oppose each other.

The aperture driver 320 may include a driving pin 323 that protrudes upward from an upper end of the moving member 321. The base 310 may include a base guide slot 310b in a corner region of the base 310 in which the pivot pin 311 is disposed, and the driving pin 323 may penetrate the base guide slot 310b, and may protrude upward in the optical axis direction. Hence, the driving pin 323 of the aperture driver 320 may be guided along a path that is formed by the base guide slot 310b, and may then move. The base guide slot 310b may extend in parallel to one edge of the base 310.

in a non-limited example, the base 310 may have a square or rectangular shape in a plan view. The base 310 may be dented downward in the optical axis direction in the entire region excluding a border along an upper edge, and the aperture cover 309 may be combined to an upper end of the base 310 and may be covered, thereby protecting constituent elements of the aperture module 300. A dented depth of the base 310 may be equal to, or at least greater than, an entire thickness of the blade unit 350.

Regarding the aperture cover 309, a cover pivot pin hole 309a may be disposed in a region that corresponds to the pivot pin 311 so that the pivot pin 311 may be inserted into the cover pivot pin hole 309a. Regarding the aperture cover 309, a cover guide slot 309b may be disposed in a region that corresponds to the base guide slot 310b so that the driving pin 323 may be inserted into the cover guide slot 309b.

Figure 6:
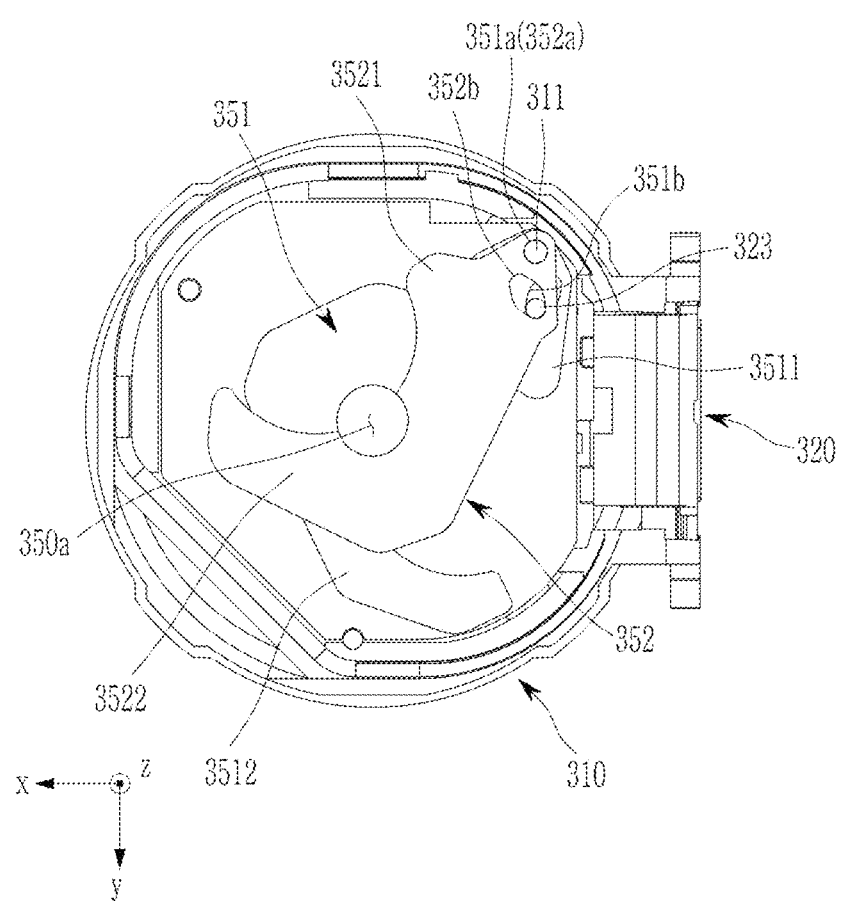
FIG. 6 illustrates a top plan view of a disposition of a blade unit on a base of an aperture module illustrated in FIG. 2 to form a first diameter aperture.
Figure 7:
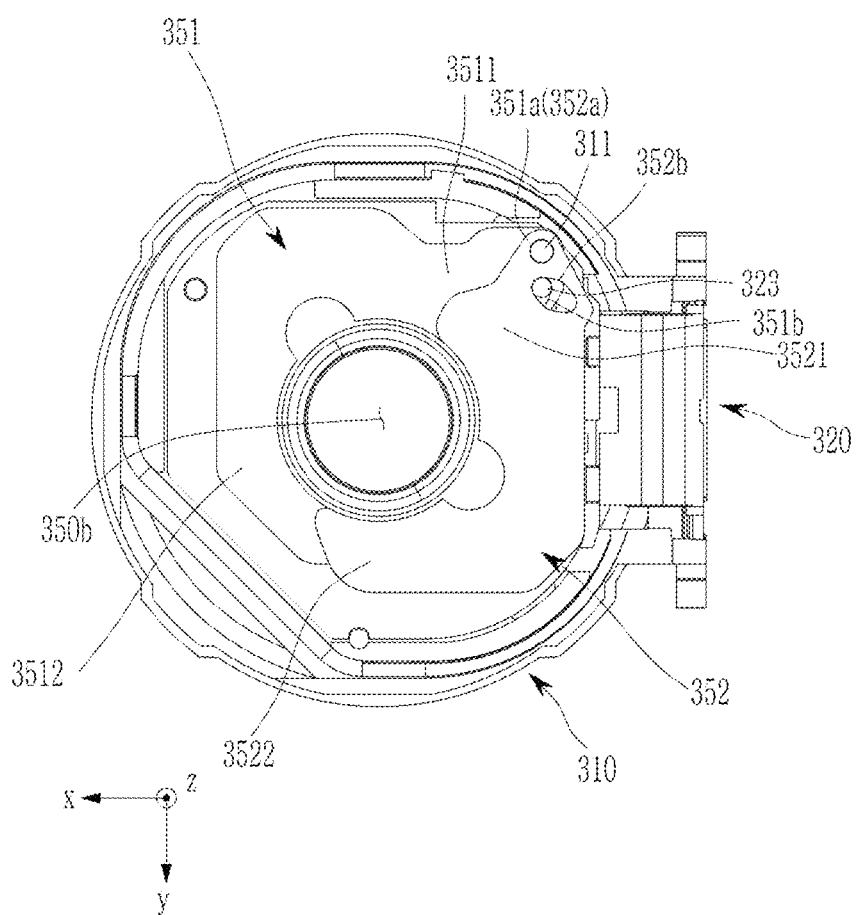
FIG. 7 illustrates a top plan view of a disposition of a blade unit on a base of an aperture module illustrated in FIG. 2 to form a second diameter aperture.

FIG. 6 illustrates a top plan view on a disposition of a blade unit on a base of an aperture module illustrated in FIG. 2 to form a first diameter aperture, and FIG. 7 shows a top plan view on a disposition of a blade unit on a base of an aperture module shown in FIG. 2 to form a second diameter aperture.

Referring to FIG. 6 and FIG. 7, the plurality of blades 351 and 352 may be provided on the base 310 when the pivot pin 311 is inserted into the pivot pin holes 351a and 352a. The plurality of blades 351 and 352 include a lower blade 351 and an upper blade 352, and, in an example, the upper blade 352 may be disposed on the lower blade 351.

The plurality of blades 351 and 352 may include a pair of driving sections 3511 and 3521, of which an overlapping region is changed as the driving pin 323 moves and which overlap each other, and a pair of shielding sections 3512 and 3522 extending therefrom semi-annularly. The one pair of shielding sections 3512 and 3522 may be rotated with respect to the pivot pin 311 as the driving pin 323 moves, and may at least partially shield the center opening 310a from the edge to form an aperture 350a of a first diameter, and an aperture 350b of a second diameter different from the first diameter.

The one pair of driving sections 3511 and 3521 may respectively include the pivot pin holes 351a and 352a and the driving holes 351b and 352b. Regarding the one pair of driving sections 3511 and 3521, the pivot pin holes 351a and 352a may overlap each other, and the driving holes 351b and 352b may form a linear symmetry with the base guide slot 310b. Regarding the one pair of shielding sections 3512 and 3522, inner concave edges forming the first diameter aperture 350a may face each other.

The driving pin 323 may move along the base guide slot 310b, the driving holes 351b and 352b, and the cover guide slot 309b as the moving member 321 of the aperture driver 320 moves.

Referring to FIG. 6, when the incident hole of the aperture module 300 is at least partly shielded, the one pair of driving sections 3511 and 3521 and the one pair of shielding sections 3512 and 3522 of the plurality of blades 351 and 352 may overlap each other to form the first diameter aperture 350a. The driving pin 323 may be disposed at ends of the driving holes 351b and 352b of the plurality of blades 351 and 352. Hence, the aperture module 300 may form the first diameter aperture 350a with a diameter that is less than that of the center opening 310a.

Referring to FIG. 7, when the incident hole of the aperture module 300 is opened, the plurality of blades 351 and 352 may be spread to respective sides compared to the example of forming the first diameter aperture 350a. The driving pin 323 may be disposed on other ends of the driving holes 351b and 352b of the plurality of blades 351 and 352. Hence, the aperture module 300 may form the second diameter aperture 350b having the incident hole with the greater diameter than the diameter of the first diameter aperture 350a.

Figure 8:
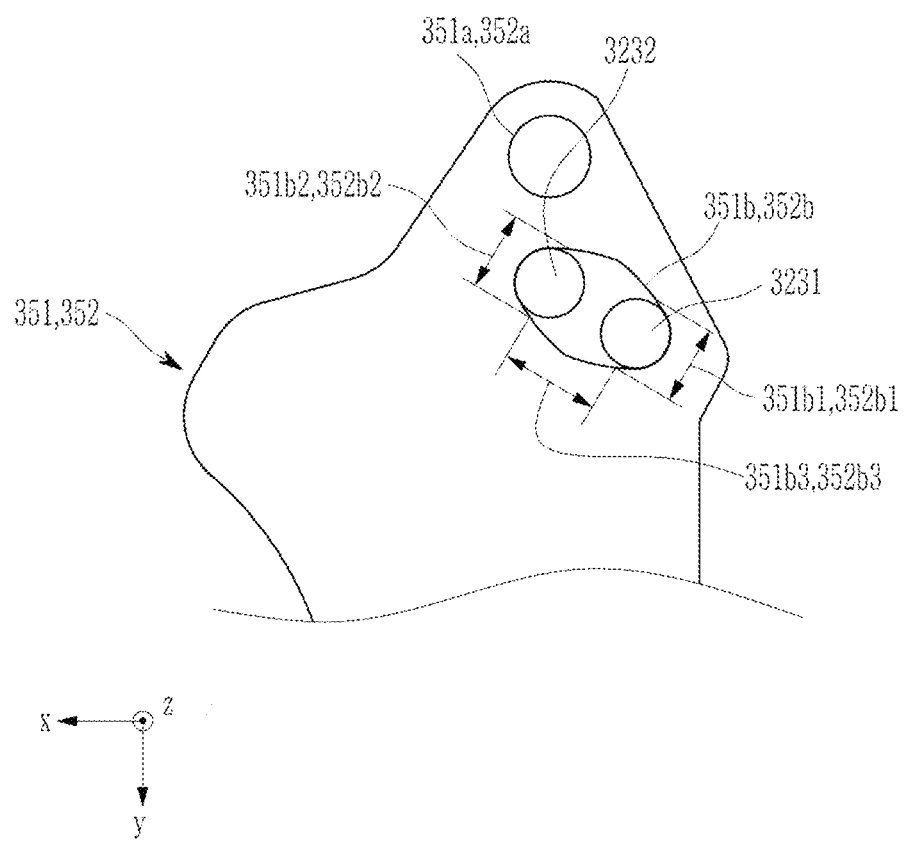
FIG. 8 illustrates a top plan view of an enlarged portion of a blade.
Figure 9:
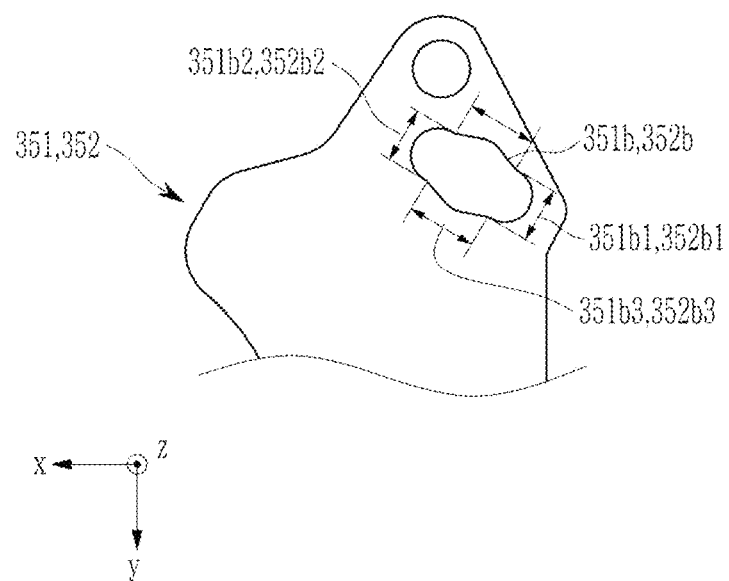
FIG. 9 illustrates an enlarged view of a driving hole according to a variation.

Referring to FIG. 8 and FIG. 9, the driving holes 351b and 352b will now be described in detail. FIG. 8 illustrates a top plan view of an enlarged portion of a blade, and FIG. 9 illustrates an enlarged view of a driving hole according to a variation. FIG. 8 illustrates that the driving pin 323 is disposed to form a first diameter aperture and a second diameter aperture.

The driving holes 351b and 352b may include first end portions 351b1 and 352b1 and second end portions 351b2 and 352b2 facing each other, and central portions 351b3 and 352b3 that connect the first end portions 351b1 and 352b1 and the second end portions 351b2 and 352b2.

The driving pin 323 may be disposed in a first state (or in a first position) to form the first diameter aperture 350a (refer to FIG. 6). The driving pin 323 may be disposed in a second state (or in a second position) to form the second diameter aperture 350b (refer to FIG. 7). For better understanding and ease of description, the driving pin 323 in the first state (or first position) will be referred to as a first driving pin 3231, and the driving pin 323 in the second state (or second position) will be referred to as a second driving pin 3232.

Widths of the driving holes 351b and 352b in a first direction that is vertical to a center line generated by connecting two points between the first end portions 351b1 and 352b1 and the second end portions 351b2 and 352b2 by a maximum distance may be different according to a second direction that is parallel to the center line. The center line may contact a line connecting a center of the first driving pin 3231 and a center of the second driving pin 3232.

The driving holes 351b and 352b may have first end portions 351b1 and 352b1 that contact the first driving pin 3231. In other words, in the first state in which the driving pin 323 is disposed to form the first diameter aperture 350a, the driving pin 323 may contact the first end portions 351b1 and 352b1. The first end portions 351b1 and 352b1 may include first ends of the driving holes 351b and 352b in the second direction. Edges of the first end portions 351b1 and 352b1 may be curves so that the first driving pin 3231 may be well disposed. Curvature of the edges of the first end portions 351b1 and 352b1 may be equal to curvature of the driving pin 323.

The driving holes 351b and 352b may have second end portions 351b2 and 352b2 contacting the second driving pin 3232. In other words, in the second state in which the driving pin 323 is disposed to form the second diameter aperture 350b, the driving pin 323 may contact the second end portions 351b2 and 352b2. The second end portions 351b2 and 352b2 may include other ends of the driving holes 351b and 352b in the second direction. Edges of the second end portions 351b2 and 352b2 may be curves so that the second driving pin 3232 may be properly disposed therein. A curvature of the edges of the second end portions 351b2 and 352b2 may be equal to curvature of the driving pin 323.

The driving holes 351b and 352b may have central portions 351b3 and 352b3 that connect the first end portions 351b1 and 352b1 and the second end portions 351b2 and 352b2. The central portions 351b3 and 352b3 may include other portions that are exclusive of the first ends and the second ends of the driving holes 351b and 352b in the second direction. In an example, the edges of the central portions 351b3 and 352b3 may be curved. However, this is only an example, and the examples are not limited thereto. A curvature of the edges of the first end portions 351b1 and 352b1 and the second end portions 351b2 and 352b2 may be greater than a curvature of the edges of the central portions 351b3 and 352b3.

When the edges of the central portions 351b3 and 352b3 are curves, they may have various values of curvature. For example, as illustrated in FIG. 8, the edges of the central portions 351b3 and 352b3 may have a relatively small curvature. As an example variation, referring to FIG. 9, the edges of the central portions 351b3 and 352b3 may have a relatively big curvature, compared to FIG. 8. Further, compared to FIG. 8, the maximum width of the central portions 351b3 and 352b3 in the first direction may have a greater value. Lengths of the edges of the first end portions 351b1 and 352b1 and the second end portions 351b2 and 352b2 may be within a half of circumference length of the driving pin 323.

Regarding the width in the first direction, the central portions 351b3 and 352b3 may have portions having widths that are greater than the maximum width of the first end portions 351b1 and 352b1 and the second end portions 351b2 and 352b2. Further, regarding the width in the first direction, the maximum width of the first end portions 351b1 and 352b1 and the second end portions 351b2 and 352b2 may be less than the widths of the central portions 351b3 and 352b3. The central portions 351b3 and 352b3 may be extended to obtain an additional space in addition to the moving path of the driving pin 323. As the widths of the central portions 351b3 and 352b3 are greater than the widths of the first end portions 351b1 and 352b1 and the second end portions 351b2 and 352b2, the sufficient space to drive the driving pin 323 may be obtained, and they may move along the edges of the central portions 351b3 and 352b3 when falling, thereby reducing the impact applied to the driving holes 351b and 352b.

The driving holes 351b and 352b may include a portion of which the width increases in the first direction when approaching the central portions 351b3 and 352b3 from at least one of the first end portions 351b1 and 352b1 and the second end portions 351b2 and 352b2. Additionally, the driving holes 351b and 352b may include a portion of which the width in the first direction increases and reduces, in the second direction. The central portions 351b3 and 352b3 may have a portion of which the width in the first direction gradually decreases when approaching the first end portions 351b1 and 352b1. The central portions 351b3 and 352b3 may have a portion of which the width in the first direction gradually decreases when approaching the second end portions 351b2 and 352b2. The central portions 351b3 and 352b3 may include a portion of which the width increases to respective sides with respect to the center line. The central portions 351b3 and 352b3 may include a portion of which the width decreases from respective sides with respect to the center line. The central portions 351b3 and 352b3 may include a portion of which the width increases and then decreases on respective sides with respect to the center line.

A diameter of the driving pin 323 may be less than the widths of the central portions 351b3 and 352b3 in the first direction. The driving holes 351b and 352b may be linearly symmetric with respect to the center line. The driving pin 323 may move back and forth on the first end portions 351b1 and 352b1 and the second end portions 351b2 and 352b2.

Figure 10:
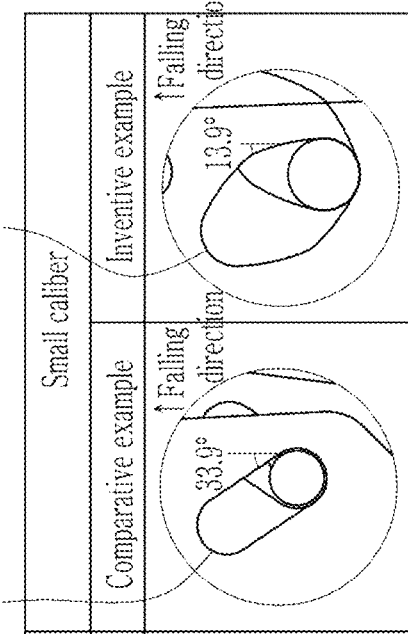
FIG. 10 illustrates a maximum deformation amount of a driving hole when a camera module falls.
Figure 11:
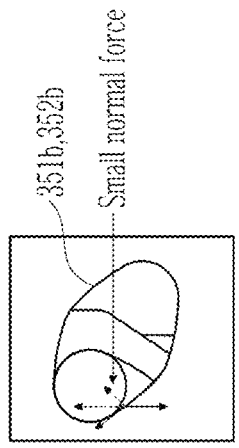
FIG. 11 illustrates a frictional force of a driving hole according to a comparative example and an embodiment.
Figure 11:
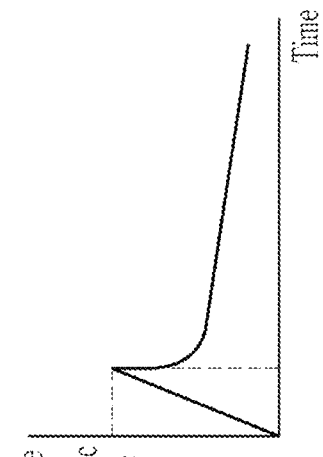
Figure 11:
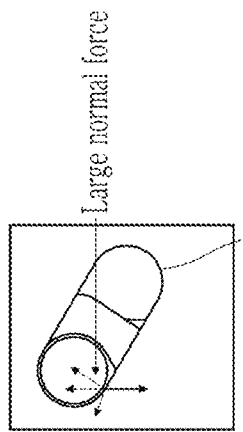
Figure 11:
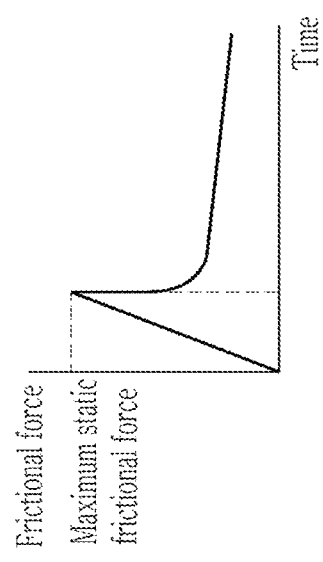

FIG. 10 illustrates a maximum deformation amount of a driving hole when a camera module falls, and FIG. 11 shows a frictional force of a driving hole according to a comparative example and an embodiment.

FIG. 10 illustrates simulation results on deformation given to the driving holes 351b and 352b caused by the impacts applied to the driving holes 351b and 352b by the driving pin 323 when the camera module 100 falls in the direction (x-axis or y-axis direction) that is vertical to the optical axis direction. Specifically, when the aperture module 300 according to an embodiment or the camera module 100 including the aperture module 300 falls in a falling direction of the x-axis or y-axis direction, the moving member 321 and the blade unit 350 may fall together in the falling direction. When the base 310 collides with a ground, the blade unit 350 connected to the base 310 moves in an opposite direction to the falling direction (i.e., changes its movement direction), but the moving member 321 that is not connected to the base 310 may move in the falling direction because of inertia. Hence, when the driving pin 323 connected to the moving member 321 moves in the falling direction, the blade unit 350 is not rotated and the driving holes 351b and 352b may be deformed.

Referring to FIG. 10, in a large caliber state such as the second diameter aperture 350b, an angle between one edge of the driving holes 1351b and 1352b according to a comparative example and a reference line that is parallel to the falling direction is 59.5°, and a relative value of a maximum deformation amount of the driving holes 1351b and 1352b disposed on the blade unit according to a comparative example is given as 1, which will now be compared to other examples. The maximum deformation amount may mean the square root of the value added after squaring each of the deformation amounts in the x-axis, y-axis, and z-axis directions of the driving holes 1351b, 1352b, 351b, and 352b.

In a large caliber state such as the second diameter aperture 350b, an angle between one edge of the driving holes 351b and 352b according to an embodiment and the reference line may be less than the angle between one edge of the driving holes 1351b and 1352b according to a comparative example and the reference line, for example, it may be 39°. In detail, an angle between one edge of the central portions 351b3 and 352b3 according to an embodiment and the reference line may be less than the angle between one edge of the driving holes 1351b and 1352b according to a comparative example and the reference line. In other words, differing from the comparative example, the driving holes 351b and 352b according to an embodiment may be inclined so that a line contacting the edges of the central portions 351b3 and 352b3 may configure an angle with the center line.

The maximum deformation amount of the driving holes 351b and 352b according to an embodiment may be 0.64 in the example of the upper blade 352 and may be 0.58 in the example of the lower blade. That is, compared to the comparative example, according to the driving holes 351b and 352b according to an embodiment, the deformation of the blade unit 350 and the driving holes 351b and 352b caused by impacts when the aperture module 300 falls, thereby increasing falling reliability and reducing risks of generation of driving defects.

Further, referring to FIG. 10, in a small caliber state such as the first diameter aperture 350a, the angle between one edge of the driving holes 1351b and 1352b according to a comparative example and the reference line that is parallel to the falling direction is 33.9°, and the maximum deformation amount of the driving holes 351b and 352b according to a comparative example may be 0.86 in the example of the upper blade and may be 0.76 in the case of the lower blade.

In a small caliber state such as the first diameter aperture 350a, the angle between one edge of the driving holes 351b and 352b according to an embodiment and the reference line may be less than the angle between one edge of the driving holes 1351b and 1352b according to a comparative example and the reference line, for example, it may be 13.9°. In detail, an angle between one edge of the central portions 351b3 and 352b3 according to an embodiment and the reference line may be less than the angle between one edge of the driving holes 1351b and 1352b according to a comparative example and the reference line. In other words, differing from the comparative example, the driving holes 351b and 352b according to an embodiment may be inclined so that a line contacting the edges of the central portions 351b3 and 352b3 may configure an angle with the center line.

The maximum deformation amount of the driving holes 351b and 352b according to an embodiment may be 0.69 in the example of the upper blade 352 and may be 0.47 in the example of the lower blade. That is, compared to the comparative example, according to the driving holes 351b and 352b according to an embodiment, the deformation of the blade unit 350 and the driving holes 351b and 352b caused by impacts when the aperture module 300 falls, thereby increasing falling reliability and reducing risks of generation of driving defects.

Referring to FIG. 11, as the driving holes 351b and 352b in which the maximum width of the first end portions 351b1 and 352b1 and the second end portions 351b2 and 352b2 is less than the width of the central portions 351b3 and 352b3 is applied according to an embodiment, a normal force working for the driving pin is reduced compared to the comparative example, a maximum static frictional force may be reduced, the driving pin may easily move so the impacts applied to the driving hole and the deformation caused by the impacts may be reduced.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. An aperture module, comprising:
a base comprising a guide slot and a protruding pivot pin disposed in a corner region of the base;
a blade unit comprising a plurality of blades each having a driving hole that overlaps at least a portion of the guide slot, and configured to pivot with respect to the pivot pin to form an aperture of a first diameter and an aperture of a second diameter; and an aperture driver comprising a driving pin disposed in the guide slot and the driving hole, and is configured to move along the guide slot, wherein the driving hole comprises a first end portion that contacts the driving pin when the aperture of the first diameter is formed, a second end portion that faces the first end portion and contacts the driving pin when the aperture of the second diameter is formed, and a central portion that connects the first end portion and the second end portion, and wherein a width of a central portion of the driving hole in a first direction that is perpendicular to a center line that connects two points between the first end portion and the second end portion by a maximum distance is greater than a maximum width of the first end portion and a maximum width of the second end portion.

2. The aperture module of claim 1, wherein:
the driving hole comprises a portion of which a width of the driving hole in the first direction increases when approaching the central portion from at least one of the first end portion and the second end portion.

3. The aperture module of claim 1, wherein:
the driving hole comprises a portion of which a width of the driving hole in the first direction increases and then reduces in a second direction that is parallel to the center line.

4. The aperture module of claim 1, wherein:
a diameter of the driving pin is less than a width of the central portion in the first direction.

5. The aperture module of claim 1, wherein:
a line that contacts an edge of the central portion is inclined to have an angle with respect to the center line.

6. The aperture module of claim 1, wherein:
a curvature of an edge of the first end portion and a curvature of an edge of the second end portion are greater than a curvature of the central portion.

7. The aperture module of claim 1, wherein:
the aperture driver comprises:
a moving member configured to move back and forth in a straight line to move the driving pin, and
an aperture driving magnet, installed in the moving member, and disposed to face an aperture driving coil.

8. The aperture module of claim 7, wherein the driving pin protrudes upward from an upper end of the moving member.

9. The aperture module of claim 1, wherein the driving hole is linearly symmetric with respect to the center line.

10. The aperture module of claim 1, wherein the plurality of blades are one pair of blades.

11. The aperture module of claim 1, wherein:
a curvature of an edge of the first end portion and a curvature of an edge of the second end portion are equal to a curvature of the driving pin.

12. The aperture module of claim 1, wherein:
the central portion comprises a portion of which a width increases to respective sides of the driving hole with respect to the center line.

13. An aperture module, comprising:
a housing having an internal space;
a lens driving module disposed in the internal space of the housing and configured to be driven in at least one of an optical axis direction and a direction that is perpendicular to the optical axis direction; and
an aperture module disposed at a front end of the lens driving module, and configured to adjust a size of an incident hole, wherein the aperture module comprises:
a base comprising a guide slot and a protruding pivot pin disposed in a corner region of the base,
a blade unit comprising a plurality of blades each having a driving hole that overlaps at least a portion of the guide slot, and configured to pivot with respect to the pivot pin to form an aperture of a first diameter and an aperture of a second diameter, and
an aperture driver comprising a driving pin configured to penetrate the guide slot and the driving hole, and configured to move along the guide slot,
wherein the driving hole comprises a first end portion that contacts the driving pin when the aperture of the first diameter is formed, a second end portion that faces the first end portion and contacts the driving pin when the aperture of the second diameter is formed, and a central portion that connects the first end portion and the second end portion, and
wherein a width of a central portion of the driving hole in a first direction that is perpendicular to a center line that connects two points between the first end portion and the second end portion by a maximum distance is greater than a maximum width of the first end portion and a maximum width of the second end portion.

14. The aperture module of claim 13, wherein:
the driving hole comprises a portion of which a width of the driving hole in the first direction increases when approaching the central portion from at least one of the first end portion and the second end portion.

15. The aperture module of claim 14, wherein:
the driving hole comprises a portion of which a width of the driving hole in the first direction increases and then reduces in a second direction that is parallel to the center line.

16. The aperture module of claim 13, wherein:
a diameter of the driving pin is less than a width of the central portion in the first direction.

17. The aperture module of claim 13, wherein:
a line that contacts an edge of the central portion is inclined to have an angle with respect to the center line.

18. The aperture module of claim 13, wherein:
the aperture driver comprises:
a moving member configured to move back and forth in a straight line to move the driving pin, and
an aperture driving magnet, installed in the moving member, and disposed to face an aperture driving coil.

19. The aperture module of claim 13, wherein the driving hole is linearly symmetric with respect to the center line.

20. The aperture module of claim 13, wherein:
the lens driving module comprises:
an auto focus (AF) carrier configured to receive a lens barrel,
an AF driver disposed outside the AF carrier and configured to move the lens barrel and the AF carrier in the optical axis direction,
an optical image stabilization (OIS) carrier disposed in the AF carrier, and
an OIS driver disposed outside the OIS carrier and configured to move the OIS carrier in a direction that is perpendicular to the optical axis direction.

21. The aperture module of claim 20, wherein the aperture driver, the AF driver, and the OIS driver are respectively disposed on different sides of the housing.

* * * * *